United States Patent [19]

Gelber

[11] Patent Number: 5,533,797
[45] Date of Patent: Jul. 9, 1996

[54] KITCHEN, BAR AND RESTAURANT APPLIANCE HOUSING

[76] Inventor: Barry S. Gelber, P.O. Box 5883, Newport Beach, Calif. 92662

[21] Appl. No.: 306,103

[22] Filed: Sep. 14, 1994

[51] Int. Cl.⁶ ............................................. A47F 3/00
[52] U.S. Cl. ................. 312/138.1; 312/329; 312/223.6; 206/320
[58] Field of Search ......................... 312/223.1, 223.6, 312/290, 329, 326, 138.1, 137, 208.6, 237, 223.5, 1, 114; 220/334, 335; 49/236; 206/320, 305, 349

[56] References Cited

U.S. PATENT DOCUMENTS

| 185,622 | 12/1876 | Brown | 312/326 |
|---|---|---|---|
| 1,822,404 | 9/1931 | Hull | 49/236 |
| 1,831,797 | 11/1931 | Arnold | 352/35 |
| 2,143,239 | 1/1939 | Foltz | 312/290 X |
| 2,300,405 | 11/1942 | Cook | 312/329 X |
| 2,607,649 | 8/1952 | Johnson | 312/290 X |
| 3,300,264 | 1/1967 | Daniels et al. | 312/223.1 X |
| 4,167,298 | 9/1979 | Plattner | 312/290 |
| 4,349,120 | 9/1982 | DiNardo | 220/335 X |
| 4,755,881 | 7/1988 | Bartlett | 312/114 X |
| 5,184,684 | 2/1993 | Kohlman | 312/329 X |

FOREIGN PATENT DOCUMENTS

| 441271 | 8/1991 | European Pat. Off. | 312/223.1 |
|---|---|---|---|
| 2801003 | 7/1979 | Germany | 312/245 |
| 530147 | 12/1940 | United Kingdom | 312/223.5 |

Primary Examiner—Laurie K. Cranmer
Assistant Examiner—Janet M. Wilkens
Attorney, Agent, or Firm—Gene Scott

[57] ABSTRACT

A housing (20) for attenuating sound from an appliance and storing excess electrical cord is provided. The housing is comprised of an enclosure (22) defining a compartment (24) having an open front and top surface and a translucent cover (28) configured to close the open front and top. The cover is rotatably mounted along an inclined hinge line (36) which allows gravity to urge it to a closed position abutting the enclosure. Chambers (42, 44) are provided for storage of excess electrical cord. When the cover is closed an exterior switch operates the appliance.

16 Claims, 4 Drawing Sheets

KITCHEN, BAR AND RESTAURANT APPLIANCE HOUSING

TECHNICAL FIELD

The present invention pertains to appliance housings and more particularly, to housings for sound attentation of kitchen, bar and restaurant appliances. This is a substitute application for Ser. No. 07/689,959 filed Apr. 22, 1991, now abandoned and includes the same matter therein.

BACKGROUND ART

Kitchen, bar and restaurant appliances often generate considerable noise levels when in operation. Blenders and coffee grinders, in particular, operate blades at very high speed which creates sound having high energy levels in the higher frequency regions which can be quite irritating. In addition, the electrical cords to such appliances often lie on a counter top which creates a hazardous environment.

The housing art is rich with apparatus for attenuation of sound. U.S. Pat. 1,831,797 concerns a portable vibration and sound proof housing for cameras having an outer metallic housing, a lining of sound absorbing material in the housing, an opening in the housing aligned with a lens of a camera disposed in the housing, a window in the opening and means for quickly detaching the window.

U.S. Pat. No. 3,868,040 describes a shell structure for use as an equipment cover. The shell structure is fabricated in two pieces of moldable plastic. The structure is such that maximum accessibility to and exposure of the equipment being covered is attainable as desired. To effect this result, one of the pieces is mounted to the other piece for pivotal movement relative thereto.

U.S. Pat. No. 4,215,762 concerns an acoustical enclosure for isolating high-frequency noise produced by automatic business machines, such as typewriters and teletypes. A top paper-feed housing is removable and a midsection is hinged to permit access to the enclosed machine. An exhaust fan removes heated air from the enclosure and an air-intake lip at the front of the enclosure permits ambient-temperature air to be taken into the enclosure.

Other U.S. Utility Patents of background interest are 3,136,398, 3,160,227, 3,960,237, and 4,258,821. A U.S. Design Patent of background interest is Des. 295,012.

DISCLOSURE OF INVENTION

The present invention is directed to a housing for attenuation of sound from kitchen, bar and restaurant appliances such as blenders and coffee grinders.

Apparatus in accordance with the invention are characterized by an enclosure defining a compartment having an open front and top for receiving the appliance and a cover mounted on an inclined hinge line to the enclosure for closing thereof by gravity. When the cover is open the front and top of the appliance are exposed for manipulation of the appliance. The cover is removable by simply lifting it from the enclosure. Such apparatus are further characterized by chambers for storage of excess electrical cord and an external switch for appliance control.

In a preferred embodiment an enclosure has a compartment with an open front and top configured to receive an appliance such as a blender. A cover is configured to close the open front and top and is rotatably mounted on an inclined hinge line. When the cover is open the top of the blender is exposed permitting removal of a lid from a container thereof without removal of the blender from the housing.

The center of gravity of the cover is arranged so that gravity urges it to abut the enclosure removing the need for latch apparatus between the cover and enclosure. A tab on the cover for opening thereof is spaced horizontally from the hinge line to reduce hand movement required to open the cover. The cover defines descending hinge pins that rotate within hinge barrels defined by the enclosure. The cover is thus removed, for cleaning of the housing, by simply lifting it from the enclosure.

A switch on the enclosure is in series with a housing electrical cord for connection to an external power source. This allows operation of the blender when the cover is closed. Two chambers are provided below the compartment for storage of excess blender electrical cord and excess housing cord. The invention will be best understood from the following description when read in conjunction with the accompanying drawings.

MODES FOR CARRYING OUT THE INVENTION

Figure 1:
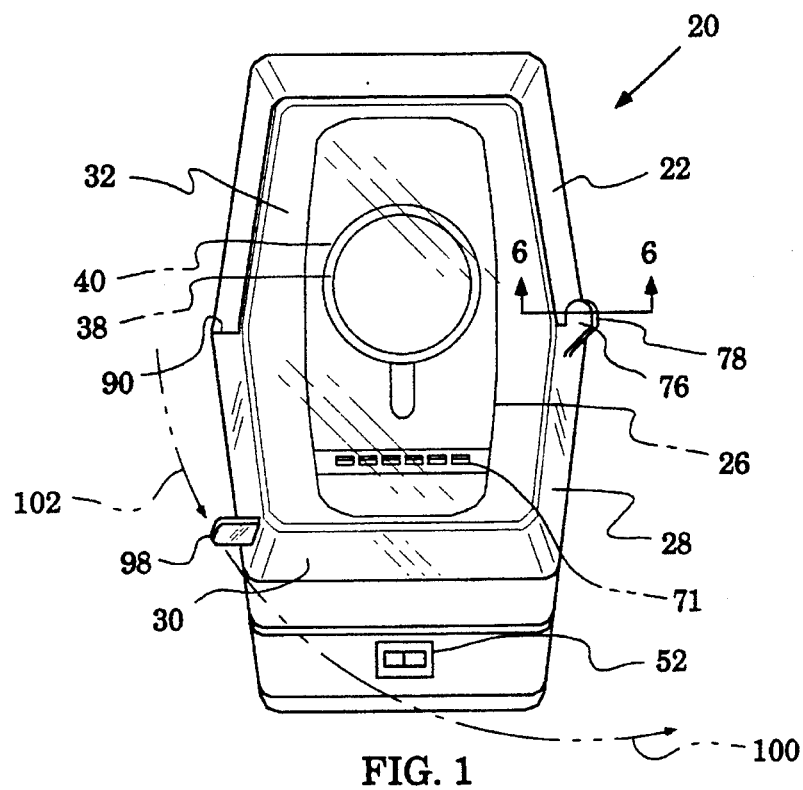
FIG. 1 is a plan view of a preferred appliance housing embodiment, in accordance with the present invention, with a blender therein.
Figure 2:
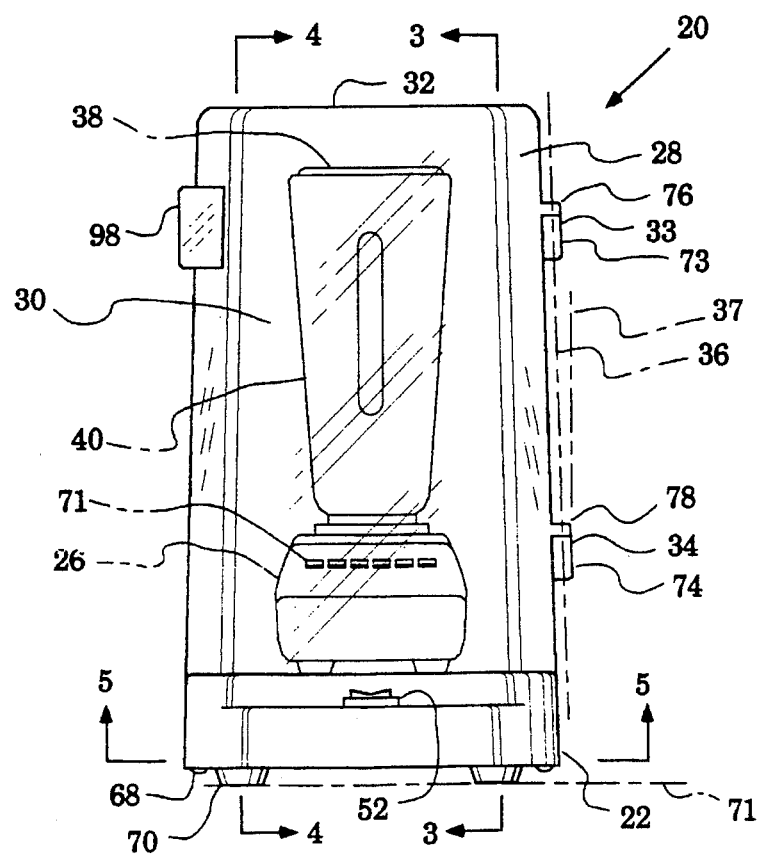
FIG. 2 is a front elevation view of the housing of FIG. 2.
Figure 3:
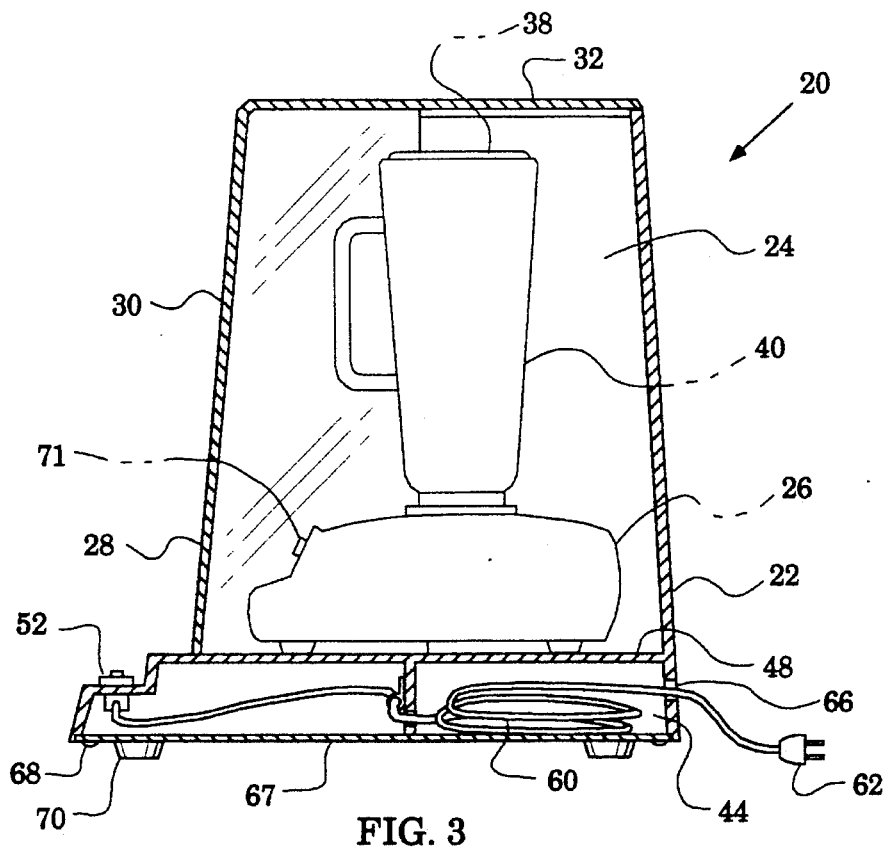
FIG. 3 is a sectional view along the plane 3—3 of FIG. 2.
Figure 4:
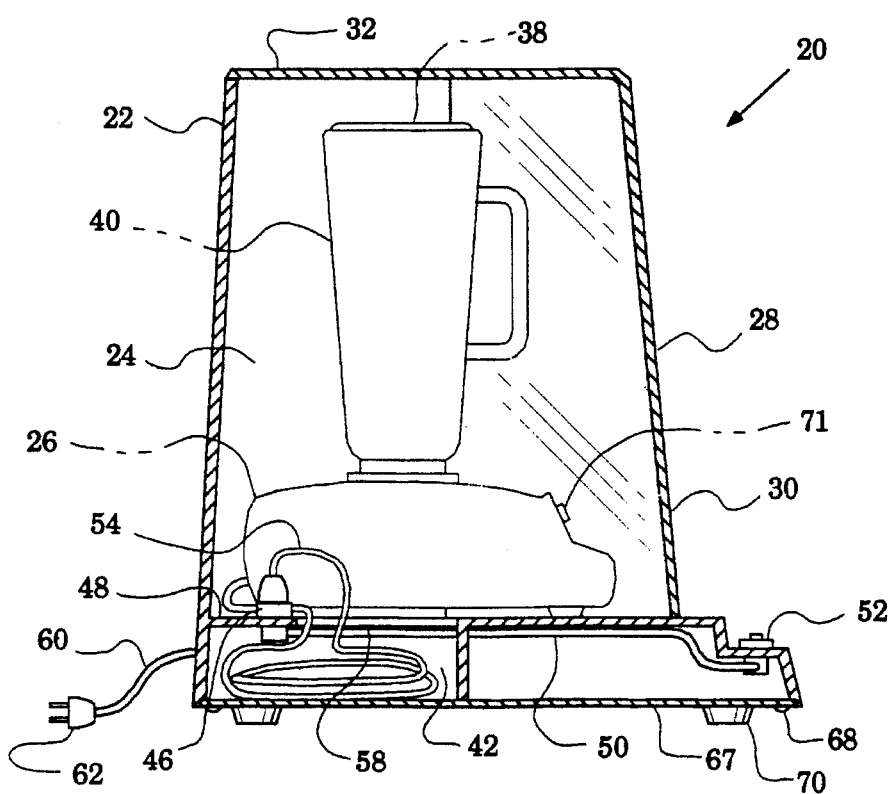
FIG. 4 is a sectional view along the plane 4—4 of FIG. 2.
Figure 5:
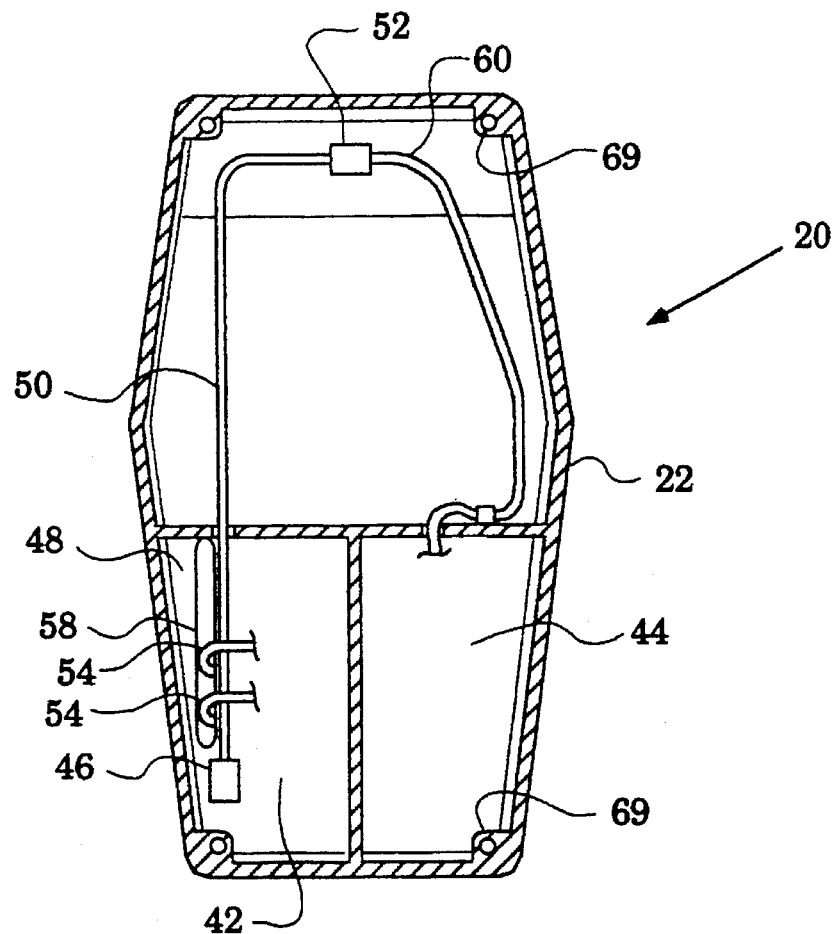
FIG. 5 is a sectional view along the plane 5—5 of FIG. 2.

FIG. 1 is a plan view of a preferred embodiment of an appliance housing 20, in accordance with the present invention, with a blender therein. FIG. 2 is a front elevation view of the housing 20. FIGS. 3, 4 and 5 are views along the planes 3—3, 4—4 and 5—5, respectively, of FIG. 2. FIGS. 1 through 5 illustrate an enclosure 22 defining a compartment 24 suitable for receiving an appliance such as the blender 26. The compartment 24 has open front and top surfaces which are closed by a cover 28. The cover 28 has a front portion 30 and a top portion 32 which close, respectively, the open front and top of the compartment 24.

The cover 28 is rotatably mounted to the enclosure 22 by hinges 33, 34 which are arranged along a hinge line 36. The hinge line 36 is inclined relative to the vertical 37 allowing gravity to urge the cover 28 toward a closed position abutting the enclosure 22.

The cover 28 is translucent enabling observance of the blender 26 and its operation at all times. When the cover 28 is swung away from the enclosure 22 the removal of the top portion 30 exposes the open top surface of the enclosure 22 and, thus, the top of the blender 38 for convenience of operation (e.g. the top 38 of the blender container 40 may be removed without removing the container 40 from the blender 26).

The enclosure 22 also defines first and second chambers 42, 44 beneath the compartment 24. An electrical receptacle 46 is mounted in the floor 48 of the compartment 24 and is connected by a conduit 50 to a switch 52 at the front of the enclosure 22. The switch 52 is of a standard type having a rocker arm operation. The blender 28 is connected by its electrical cord 54 to the receptacle 46. The compartment 24 communicates with the first chamber 42 through a slot 58 in the floor 48. Excess of the blender cord 54 is easily passed through the slot 58 into the first chamber 42. The cord 54 is thus securely stored which contributes to a safe operating environment.

A housing cord 60 connects the switch 52 to a plug 62 by which the housing 20 may be connected to an external power source (e.g. one on a kitchen counter). A hole 66 provides communication between the second chamber 44 and the power source. Excess of the housing cord 60 may be passed through the hole 66 which causes the cord 60 to coil within the second chamber 44. This secure storage of excess housing cord 66 also contributes to a safe operating environment.

A panel 67 closes the bottom of the first and second chambers 42, 44. It is attached by screws 68 disposed in bosses 69 (shown in FIG. 5) in the bottom of the enclosure 22. Resilient housing feet 70 are attached to the panel 67. The feet 70 thus abut a surface 71 (shown in FIG. 2) upon which the housing 20 is placed. For clarity of illustration, the blender cord 54 and the housing cord 60 are not shown in full in FIG. 5.

The blender 28 may, therefore, be placed within the housing 22, its electrical cord 54 connected to the plug 46 and excess cord 54 stored in the first chamber 42. After the controls 71 of the blender are set for operation, the cover 28 is allowed to swing shut under urging of gravity and the switch 52 enabled to energize the blender 26. The operational noise of the blender 26 is thus attenuated while additional protection is afforded in case of a malfunction of the blender 26.

Figure 6:
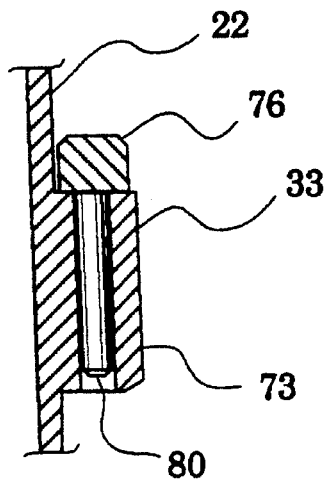
FIG. 6 is a sectional view along the plane 6—6 of FIG. 1.
Figure 7:
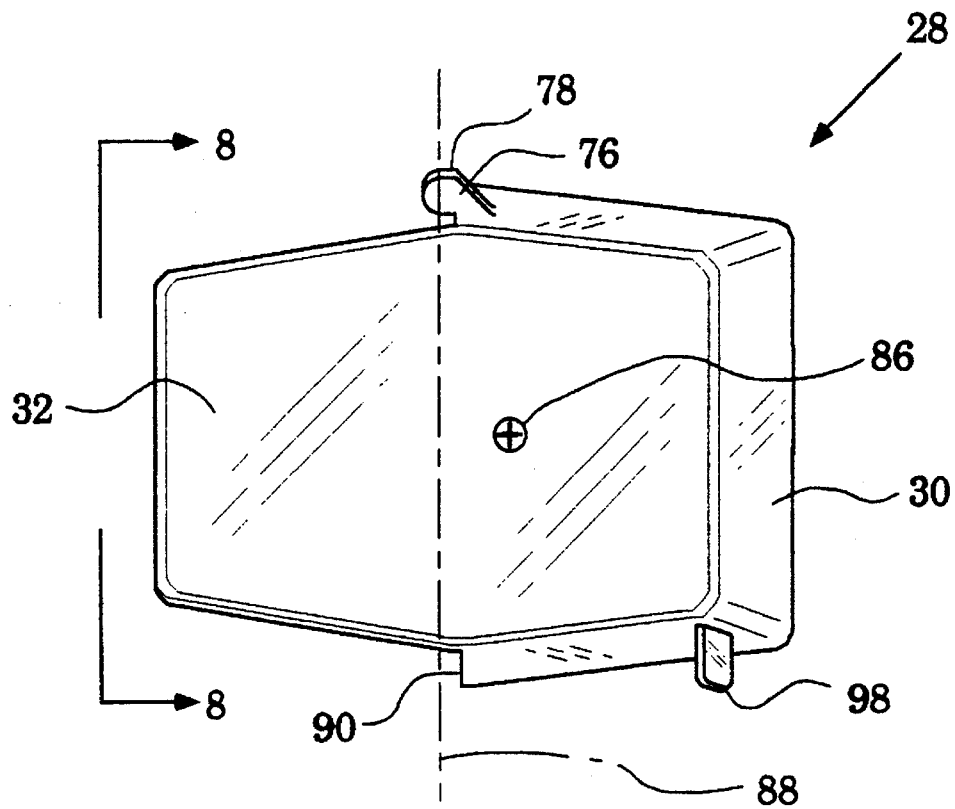
FIG. 7 is a plan view of the cover of the housing of FIG. 1.
Figure 8:
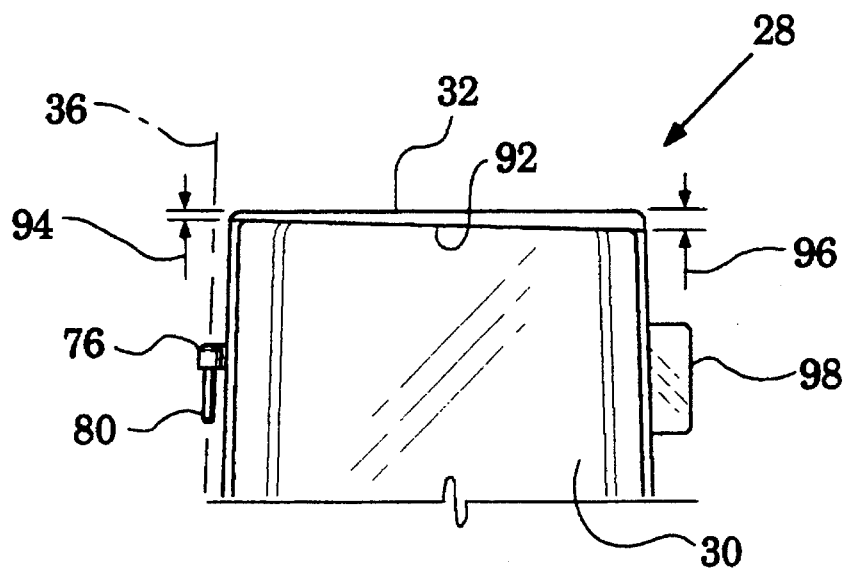
FIG. 8 is a view along the plane 8—8 of FIG. 7.

FIG. 2 illustrates that the hinges 33, 34 are comprised of hinge barrels 73, 74 and hinge bosses 76, 78. FIG. 6 is a sectional view along the plane 6—6 of FIG. 1. FIG. 7 is a plan view of the cover 28 while FIG. 8 is a view along the plane 8—8 of FIG. 7. FIG. 6 shows the enclosure 22 defining the hinge barrel 73 and FIG. 8 shows the cover 28 defining the hinge boss 76 which terminates in a descending hinge pin. Only the hinge pin 80, descending from boss 76, is shown. A similar hinge pin descends from the boss 78. This configuration of hinge barrels and pins allows the cover 28 to be removed from the enclosure 22 by simply lifting it upward. This feature of the invention contributes to ease of cleaning and maintenance.

The inclined hinge line (36 in FIG. 2) will cause gravity to urge the center of gravity 86 of the cover 28 to lie on a plane 88 that runs through the hinge line 36 and is normal to the surface (71 in FIG. 2) upon which the housing 20 rests. The plane 88 is thus viewed along its edge in FIG. 7 where its relationship to the cover 28 is apparent. Because the front portion 30 of the cover 28 is larger than the top portion 32, the center of gravity 86 is spaced away from the plane 88 toward the front portion 32. This insures that gravity will urge the vertical termination 90 of the front portion 32 to abut the enclosure 22. Thus a latch to engage the cover 28 and enclosure 22 is not required and an economical labor operation of the cover 28 is provided. The vertical termination 90 is also shown, abutting the enclosure 22, in FIG. 1.

FIG. 8 also illustrates that the lower surface 92 of the top portion 32 is normal to the inclined hinge line 36. This allows the top portion 32 to freely clear the enclosure (22 in FIG. 1) as the cover 28 swings around the hinge line 36. Because of this the top portion increases from a thickness 94 adjacent the hinge line 36 to a thickness 96 at the far side of the cover 28. The enclosure 22 is correspondingly slanted to conform with the lower surface 92.

As shown in FIG. 1, a tab 98 is provided on the cover 28 to allow a user of the housing 20 to open the cover. The tab 98 is spaced well forward of the hinge line (36 in FIG. 2). Thus the hand movement, represented by the arrow 100, required to open the cover 28 is reduced. The additional movement 102 which would be required if the tab were positioned nearer the compartment 24 is avoided. Thus the cover 28 has a fast response action which saves time in operation of the housing 20 and the blender 26.

The enclosure 22 and the cover 28 may be effectively fabricated from thermoplastic polymers such as, respectively, polycarbonate and polystyrene.

From the foregoing it should now be recognized that an appliance housing 20 has been disclosed herein configured to attenuate appliance noise and provide a safe operating environment. Although the present invention has been described with reference to preferred embodiments, numerous modifications and rearrangements can be made with the equivalent result still embraced within the scope of the invention.

What is claimed is:

1. Housing apparatus, comprising:

an enclosure defining a compartment with an open front and top for receiving an appliance;

a translucent cover configured to close said compartment open front and top and rotatably mounted to said enclosure on an inclined hinge line, gravity thereby urging said cover toward a closed position abutting said enclosure;

an electrical receptacle in said compartment for receiving an electrical cord of the appliance;

an electrical housing cord connected to said receptacle;

a first chamber, below said compartment, configured to receive therein excess length of the appliance cord, and a second chamber, below said compartment, configured to receive therein excess length of the housing cord; and a slot providing communication between said compartment and said first chamber for passing excess length of the appliance cord therethrough.

2. Apparatus as defined in claim 1 further comprising:

an electrical housing plug for connecting said housing cord to a power source; and a switch on said enclosure, accessible outside said cover and interconnected with said receptacle and said housing plug.

3. Apparatus as defined in claim 2 wherein said enclosure defines a hole providing communication between said second chamber and a power source for passing excess length of said housing cord therethrough.

4. Apparatus as defined in claim 1 wherein:

said enclosure has a plurality of hinge barrels; and said cover has a plurality of descending hinge pins, each of said pins adapted to rotate within a corresponding one of said barrels;

said cover thereby removable from said enclosure by lifting therefrom.

5. Apparatus as defined in claim 1 used on a horizontal surface, said surface employed for support of the apparatus wherein:

said housing apparatus rests upon the horizontal surface and a plane is defined passing through said hinge line and normal to said surface; and wherein said compartment and the center of gravity of said cover are on opposite sides of said plane, gravity thereby urging said cover to abut said enclosure whereby sound from the appliance is attenuated.

6. Apparatus as defined in claim 1 wherein said cover has a tab horizontally spaced from said hinge line.

7. Apparatus as defined in claim 1 wherein the portion of said cover closing said compartment top abuts said enclosure along a plane normal to said hinge line thereby insuring said cover freely rotates relative to said enclosure.

8. Apparatus as defined in claim 7 wherein said enclosure defines a hole providing communication between said second chamber and a power source for passing excess length of said housing cord therethrough.

9. Apparatus as defined in claim 8 wherein:

said enclosure has a plurality of hinge barrels; and said cover has a plurality of descending hinge pins, each of said pins adapted to rotate within a corresponding one of said barrels;

said cover thereby removable from said enclosure by lifting therefrom.

10. Apparatus as defined in claim 9, used on a horizontal surface, said surface employed for support of the apparatus wherein:

said housing apparatus rests upon the horizontal surface and a plane is defined passing through said hinge line and normal to said surface; and wherein said compartment and the center of gravity of said cover are on opposite sides of said plane, gravity thereby urging said cover to abut said enclosure whereby sound from the appliance is attenuated.

11. Apparatus as defined in claim 10 wherein said cover has a tab horizontally spaced from said hinge line.

12. Apparatus as defined in claim 11 wherein the portion of said cover closing said compartment top abuts said enclosure along a plane normal to said hinge line thereby insuring said cover freely rotates relative to said enclosure.

13. A method of housing an appliance, comprising:

defining with an enclosure a compartment having an open front and top;

installing the appliance in said compartment;

configuring a translucent cover to close the open front and top of said compartment;

mounting said cover on said enclosure along an inclined hinge line to urge said cover toward a closed position abutting said enclosure;

mounting an electrical receptacle in said compartment to receive an electrical cord of the appliance;

connecting an electrical housing cord terminating in an electrical housing plug to said receptacle;

disposing an electrical switch on said enclosure between said receptacle and said housing plug;

defining with said enclosure a first chamber below said compartment configured to receive excess length of the appliance cord;

defining with said enclosure a slot providing communication between said compartment and said first chamber to pass excess length of appliance cord therethrough;

defining with said enclosure a second chamber below said compartment configured to receive excess length of said housing cord; and defining with said enclosure a hole providing communication between an external power source and said second chamber to pass excess length of said housing cord therethrough.

14. A method as defined in claim 13 further comprising:

disposing on said enclosure a plurality of hinge barrels; and descending from said cover a plurality of hinge pins each configured to rotate within a corresponding one of said barrels;

whereby said cover may be lifted from said enclosure.

15. A method as defined in claim 13, the housing is used on a horizontal surface, said surface employed for support of the apparatus, further comprising configuring said cover so that its center of gravity and said compartment are on opposite sides of a plane through said hinge line and normal to the horizontal surface upon which the housing sets, gravity thereby urging said cover to abut said enclosure.

16. A method as defined in claim 13 further comprising:

configuring the portion of said cover closing said compartment top to abut said enclosure along a plane normal to said hinge line to insure free rotation of said cover relative to said enclosure;

configuring a tab; and spacing said tab on said cover horizontally from said hinge line.

* * * * *